United States Patent
Lynch et al.

(10) Patent No.: US 11,781,813 B2
(45) Date of Patent: Oct. 10, 2023

(54) MULTI-SCALE UNITARY RADIAL HEAT EXCHANGER CORE

(71) Applicant: Hamilton Sundstrand Corporation, Charlotte, NC (US)

(72) Inventors: Matthew E. Lynch, Canton, CT (US); Evan J. Butcher, Suffield, CT (US); Lawrence A. Binek, Glastonbury, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 14 days.

(21) Appl. No.: 17/127,069

(22) Filed: Dec. 18, 2020

(65) Prior Publication Data

US 2022/0196332 A1  Jun. 23, 2022

(51) Int. Cl.
*F28D 7/10* (2006.01)

(52) U.S. Cl.
CPC .................................. *F28D 7/103* (2013.01)

(58) Field of Classification Search
CPC .. F28D 7/10; F28D 7/103; F28D 7/106; F28F 1/06; F28F 1/08; F28F 2215/10
See application file for complete search history.

(56) References Cited

U.S. PATENT DOCUMENTS

| | | | |
|---|---|---|---|
| 237,674 A * | 2/1881 | Brooks | F28D 7/103 165/155 |
| 4,096,616 A | 6/1978 | Coffinberry | |
| 10,041,741 B2 | 8/2018 | Turcotte et al. | |
| 10,234,209 B2 | 3/2019 | Tokuda et al. | |
| 10,406,601 B2 | 9/2019 | Martin et al. | |
| 2014/0182828 A1 | 7/2014 | Lekhin | |
| 2020/0309459 A1 | 10/2020 | Streeter | |

FOREIGN PATENT DOCUMENTS

| | | | |
|---|---|---|---|
| DE | 2841482 A1 | | 7/1979 |
| DE | 3101138 A1 | | 8/1982 |
| DE | 10213544 A1 | | 7/2003 |
| EP | 0582835 | * | 7/1993 |
| GB | 2065861 | * | 7/1981 |
| WO | 2013164085 A1 | | 11/2013 |

OTHER PUBLICATIONS

Extended European Search Report dated Mar. 14, 2022, received for corresponding European Application No. 21200786.8, pp. 7.

* cited by examiner

*Primary Examiner* — Eric S Ruppert
(74) *Attorney, Agent, or Firm* — Kinney & Lange, P.A.

(57) ABSTRACT

A heat exchanger core includes a first hollow cylinder extending circumferentially around a center axis and extending axially along the center axis. The first hollow cylinder includes a first passage disposed radially within the first hollow cylinder and extending axially through the first hollow cylinder. A second hollow cylinder extends circumferentially around the center axis and extends axially along the center axis. The first hollow cylinder is disposed radially within the second hollow cylinder. The second hollow cylinder includes a second passage disposed radially between the first hollow cylinder and the second hollow cylinder and extending axially between the first hollow cylinder and the second hollow cylinder. The first hollow cylinder fluidically separates the first passage from the second passage. The first and second hollow cylinders and the first and second passages are spaced from one another in a sinusoidal relationship.

18 Claims, 13 Drawing Sheets

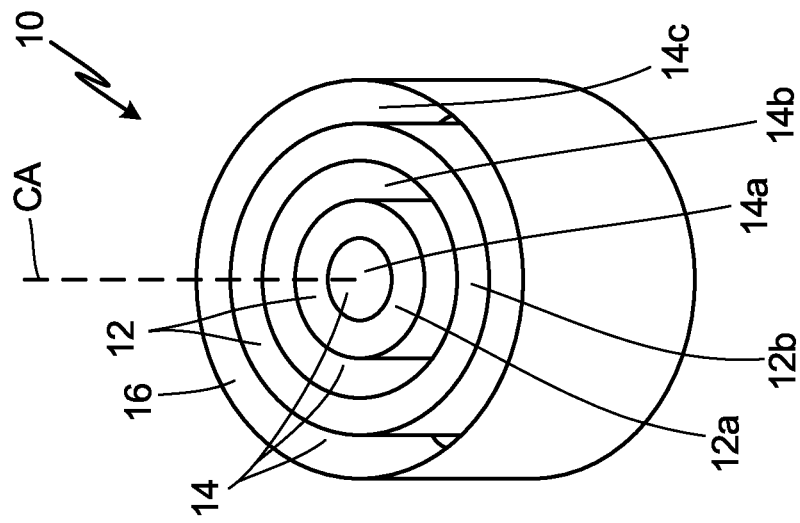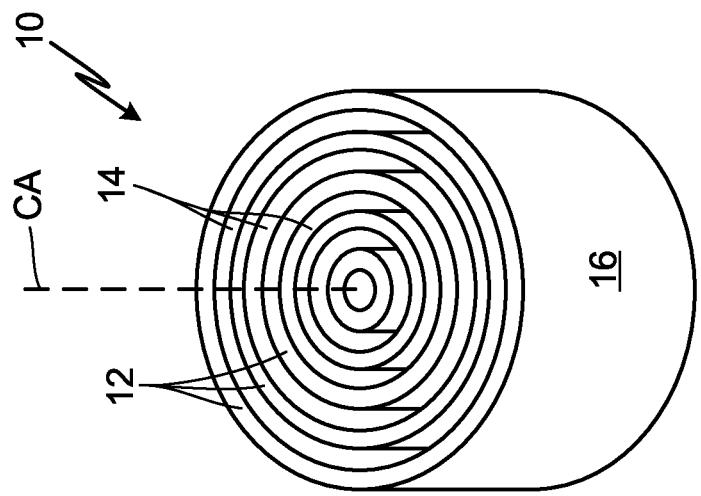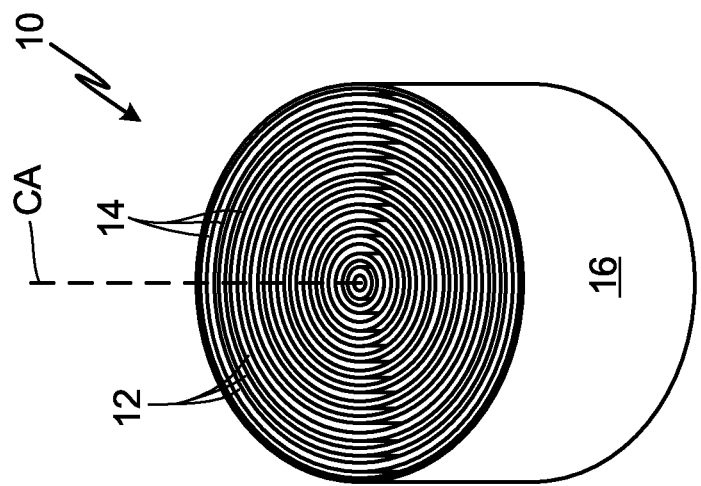

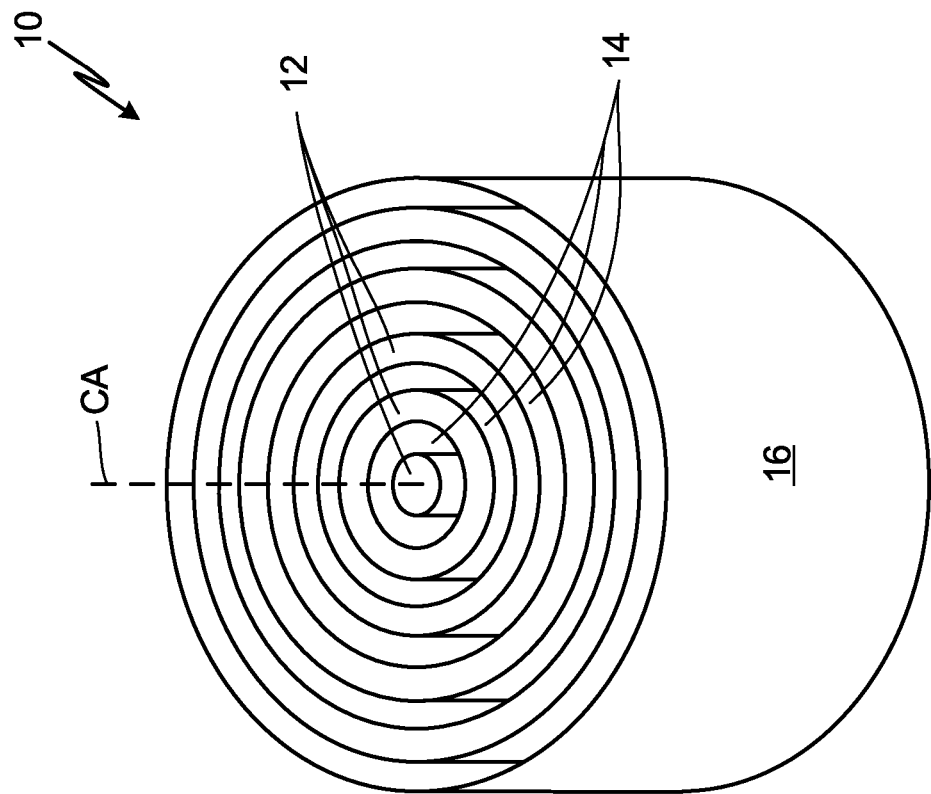

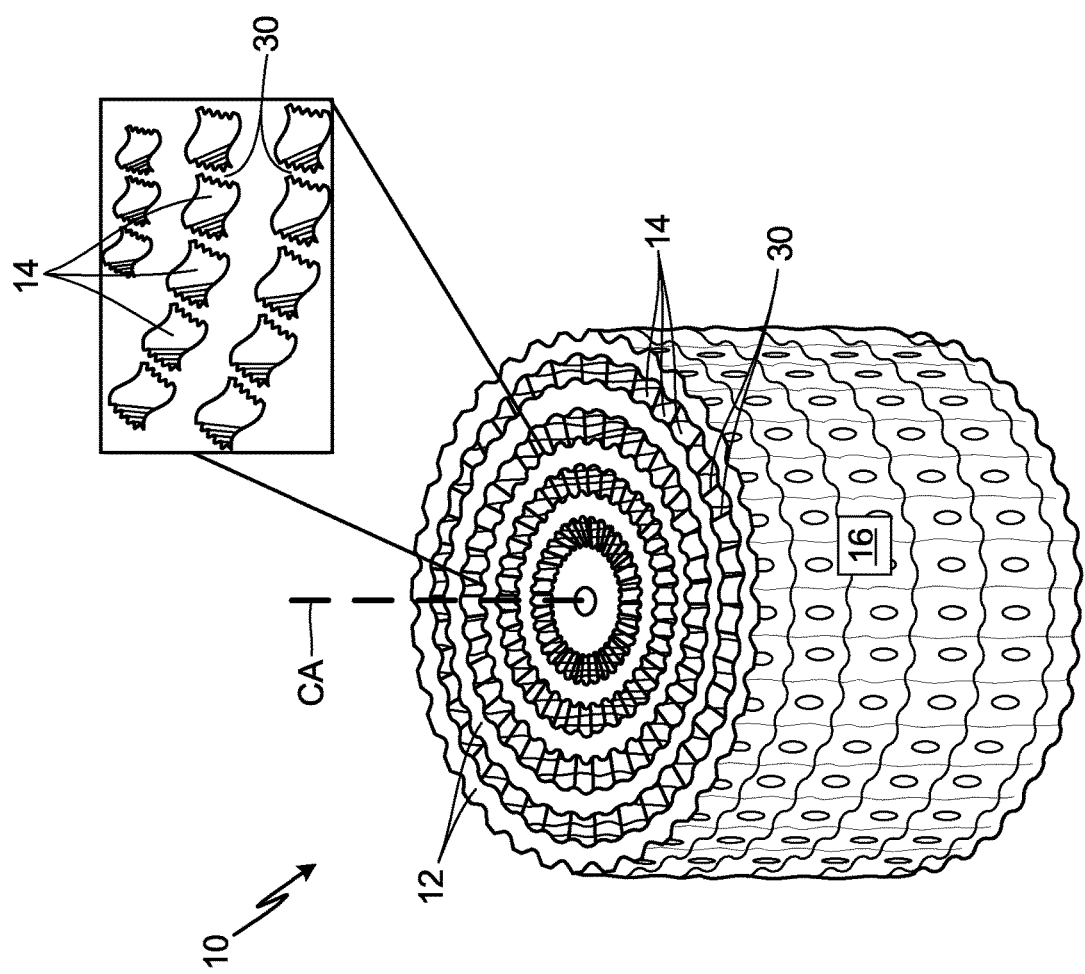

MULTI-SCALE UNITARY RADIAL HEAT EXCHANGER CORE

BACKGROUND

The present disclosure relates to heat exchangers, and in particular to heat exchanger cores.

Heat exchangers are often used to transfer heat between two fluids. For example, on aircraft, heat exchangers are used to transfer heat between a relatively hot air source, e.g., bleed air from a gas turbine engine, and a relatively cool air source, e.g., ram air. Heat exchangers built for aircraft must be compact yet provide enough heat transfer surface area for adequate heat transfer. Maximizing the heat transfer surface area increases the effectiveness of the heat exchanger.

SUMMARY

In one example, a heat exchanger core includes a first hollow cylinder extending circumferentially around a center axis and extending axially along the center axis. The first hollow cylinder includes a first passage disposed radially within the first hollow cylinder and extending axially through the first hollow cylinder. A second hollow cylinder extends circumferentially around the center axis and extends axially along the center axis. The first hollow cylinder is disposed radially within the second hollow cylinder. The second hollow cylinder includes a second passage disposed radially between the first hollow cylinder and the second hollow cylinder and extending axially between the first hollow cylinder and the second hollow cylinder. The first hollow cylinder fluidically separates the first passage from the second passage. The first and second hollow cylinders and the first and second passages are spaced from one another in a sinusoidal relationship.

In another example, a heat exchanger core includes a first hollow cylinder extending circumferentially around a center axis and extending axially along the center axis. The first hollow cylinder includes a first passage disposed radially within the first hollow cylinder and extending axially through the first hollow cylinder. A second hollow cylinder extends circumferentially around the center axis and extends axially along the center axis. The first hollow cylinder is disposed radially within the second hollow cylinder. The second hollow cylinder includes a second passage disposed radially between the first hollow cylinder and the second hollow cylinder and extending axially between the first hollow cylinder and the second hollow cylinder. The first cylinder fluidically separates the first passage from the second passage. The first and second hollow cylinders and the first and second passages are spaced from one another by the following relationship:

$$\emptyset = \sin\frac{2\pi}{d'}r';$$

where Ø is the phase field, d' is the wavelength, and r' is a radius of the heat exchanger core relative the central axis.

BRIEF DESCRIPTION OF THE DRAWINGS

FIG. 1A is a perspective view of a radial heat exchanger core.

FIG. 1B is a perspective view of another embodiment of a radial heat exchanger core including a plurality of cylinders.

FIG. 1C is a perspective view of another embodiment of a radial heat exchanger core including a plurality of cylinders.

FIG. 3 is a perspective view of another embodiment of a radial heat exchanger core with a plurality of cylinders.

FIG. 9A is a perspective view of another embodiment of a radial heat exchanger core including a plurality of struts with a contoured profile.

Figure 1D:
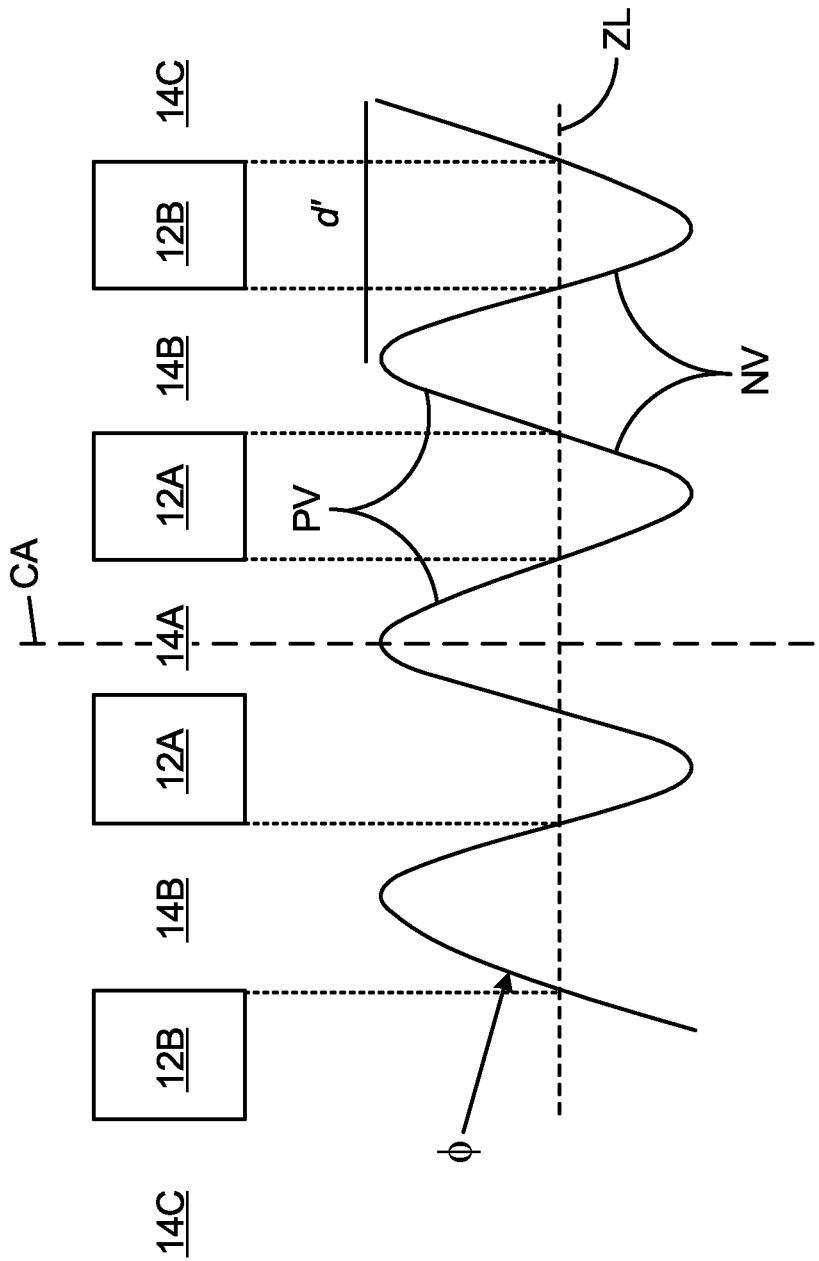
FIG. 1D is a schematic diagram of another embodiment of a radial heat exchanger core including a sinusoidal profile.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

The present disclosure relates to a radial heat exchanger core. The radial heat exchanger core is scalable to tailor the radial heat exchanger core to a desired performance level and to fit within a desired space envelope. The radial heat exchanger core includes at least a first hollow cylinder and a second hollow cylinder extending axially relative to a center axis. The first and second hollow cylinders are both tubes with the first hollow cylinder disposed within the second hollow cylinder. A first passage is disposed within the first hollow cylinder. A second passage is radially between the first and second hollow cylinders. The scalable radial heat exchanger core will be discussed with reference to FIGS. 1A-9C.

FIGS. 1A-1D will be discussed concurrently. FIG. 1A is a perspective view of radial heat exchanger core 10 with a plurality of cylinders 12. FIG. 1B is a perspective view of radial heat exchanger core 10 with a greater number of cylinders 12 than the example shown in FIG. 1A. FIG. 1C is a perspective view of radial heat exchanger core 10 a greater number of cylinders 12 than the example of FIG. 1B. FIG. 1D is a schematic diagram of another embodiment of core 10 including sinusoidal relationship Ø.

As shown in FIGS. 1A-1C, radial heat exchanger core ("core") 10 includes hollow cylinders ("cylinders") 12, passages 14, envelope 16, and central axis CA. In the example of FIG. 1A, cylinders 12 include first hollow cylinder $12_a$ and second hollow cylinder $12_b$. Passages 14 include first passage $14_a$, second passage $14_b$, and third passage 14, Center Axis CA extends through a center of core 10.

First cylinder $12_a$ extends circumferentially around center axis CA and extends axially relative to center axis CA. Second cylinder $12_b$ extends circumferentially around center axis CA and extends axially relative to center axis CA. First cylinder $12_a$ is disposed radially within second cylinder $12_b$ such that second cylinder $12_b$ extends circumferentially around first cylinder $12_a$. First passage $14_a$ is disposed radially within first cylinder $12_a$ and extends axially through first cylinder $12_a$. Second passage $14_b$ is radially between first cylinder $12_a$ and second cylinder $12_b$ and extends axially between first and second cylinders ($12_a$ and $12_b$). Envelope 16 defines a perimeter of core 10 and extends circumferentially around center axis CA and second cylinder $12_b$, and extends axially relative to center axis CA. Third passage $14_c$ is radially between second cylinder $12_b$ and envelope 16 and extends axially between second cylinder $12_b$ and envelope 16. First cylinder $12_a$ fluidically separates first passage $14_a$ from second passage $14_b$. Second cylinder $12_b$ fluidically separates second passage $14_b$ from third passage $14_c$.

In some examples, first passage $14_a$ and third passage $14_c$ can direct a hot fluid, e.g., bleed air from a gas turbine engine or any other hot fluid source on an aircraft, through core 10. Second passage $14_b$ can direct a cold fluid, e.g., ram air or any other cold fluid source, through core 10. In other examples, first passage $12_a$ and third passage $12_c$ can direct a cold fluid, e.g., ram air or any other cold fluid source, through core 10. Second passage $12_b$ can direct a hot fluid, e.g., bleed air from a gas turbine engine or any other hot fluid source on an aircraft, through core 10.

As shown in FIGS. 1A-1C, cylinders 12 and passages 14 are spaced from one another in a sinusoidal relationship. The sinusoidal relationship enables the scaling of heat exchanger core 10 to accommodate changes to envelope 16. The examples of core 10 in FIGS. 1B and 1C are scaled sinusoidally relative the example of core 10 in FIG. 1C. For example, the sinusoidal relationship cylinders 12 and passages 14 in core 10 can follow the following relationship:

$$\emptyset = \sin\frac{2\pi}{d'} r';$$

where sinusoidal relationship Ø is a phase-field that scales core 10. Wavelength d' is a wavelength of sinusoidal relationship Ø that determines a radial distance between cylinders 12 and passages 14 relative center axis CA. Radius r' is a radius of core 10 relative central axis CA.

Wavelength d' influences the heat transfer capabilities of core 10. As shown in FIG. 1A, an increased wavelength d', increases the distance between cylinders 12 and the distance between passages 14. The increased distance between cylinders 12 and between passages 14 decreases the quantity of cylinders 12 and passages 14 that can fit within radius r' and envelope 16. The reduced amount of cylinders 12 and passages 14 decreases the heat transfer capabilities of core 10. As shown in FIG. 1B, decreasing wavelength d' decreases the distance between cylinders 12 and passages 14. The reduced distance between cylinders 12 and passages 14 increases the quantity of cylinders 12 and passages 14 that can fit within envelope 16. The increased quantity of cylinders 12 and passages 14 inside envelope 16 increases the heat transfer capabilities of core 10. As shown in FIG. 1C, further decreasing wavelength d' decreases the distance between cylinders 12 and passages 14. The decreased distance between cylinders 12 and passages 14 further increases the quantity of cylinders 12 and passages 14 that can fit within envelope 16. The increased amount of cylinders 12 and passages 14 increases the heat transfer capabilities of core 10. A wall thickness of cylinders 12 can also be adjusted as wavelength d' is increased or decreased between the examples of FIGS. 1A-1C. The wall thickness of cylinders 12 is discussed below in further detail with reference to FIG. 2.

As shown in FIG. 1D, sinusoidal relationship Ø determines the placement of cylinders 12 and passages 14 within envelope 16 of core 10. Sinusoidal relationship Ø includes positive values PV and negative values NV. As shown in FIG. 1D, sinusoidal relationship Ø varies with radial distance from center axis CA. Zero-line ZL is graphed on sinusoidal relationship Ø. Zero-line ZL is the transition line between positive values PV and negative values NV. Values of sinusoidal relationship Ø above zero-line ZL are positive values PV. Values of sinusoidal relationship Ø below zero-line ZL are negative values NV. Values of sinusoidal relationship Ø on zero-line ZL are considered to have a zero value. As shown in FIG. 1D, cylinders 12 align with negative values NV and passages 14 align with positive values PV. When wavelength d' of sinusoidal relationship Ø is increased, cylinders (12a and 12b) and passages (14a and 14b) each increase in diameter and the total number of cylinders 12 and passages 14 within envelope 16 decreases. When wavelength d' of sinusoidal relationship Ø is decreased, cylinders (12a and 12b) and passages (14a and 14b) each decrease in diameter and a greater number of cylinders 12 and passages 14 will fit within envelope 16.

Figure 2:
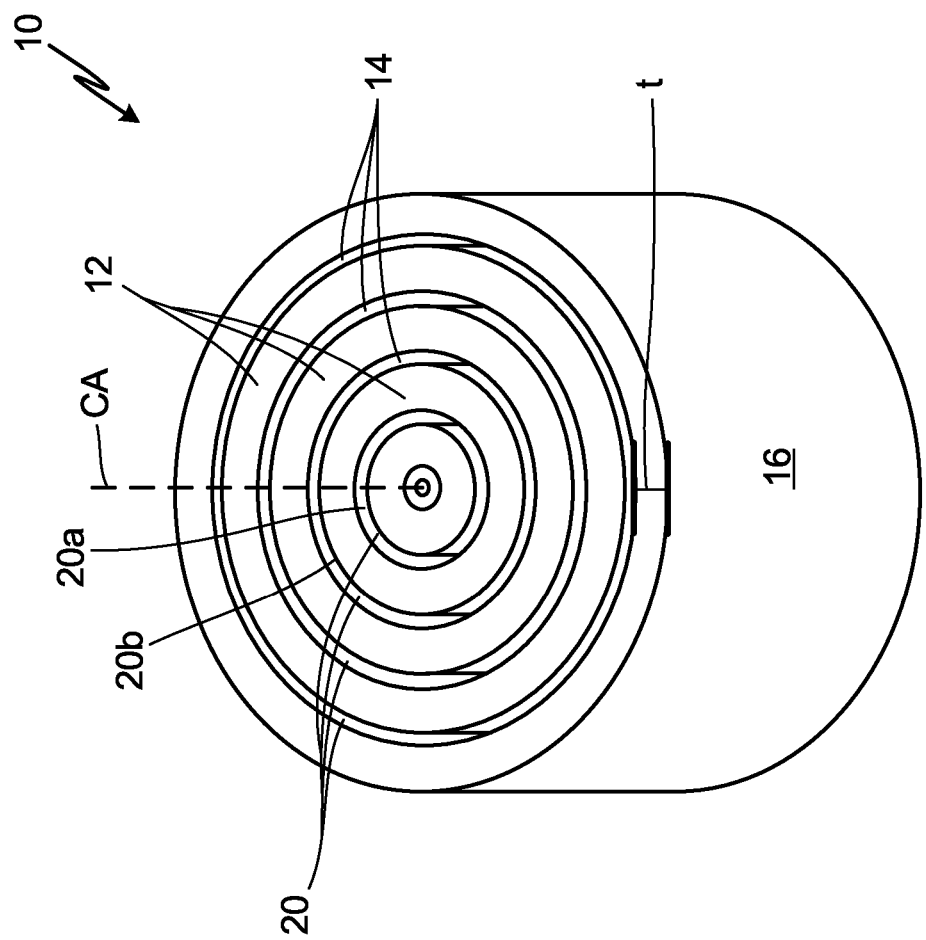
FIG. 2 is a perspective view of another embodiment of a radial heat exchanger core.

FIG. 2 is a perspective view of core 10 with an increased wall thickness t of cylinders 12. Each of cylinders 12 includes first surface 20a, second surface 20b, and wall thickness t. First surface 20a is a radially inner surface of cylinder 12 and second surface 20b is a radially outer surface of cylinder 12. Surfaces 20 extend circumferentially around center axis CA and extend axially relative to center axis CA. Thickness t is a radial distance between first surface 20a and second surface 20b. Wall thickness t can be included into sinusoidal relationship Ø in the following manner:

$$\emptyset = \sin\left(\frac{2\pi}{d'} r'\right) + C';$$

where thickness modifier C' is a constant that determines wall thickness t of cylinders 12. Surfaces 20 are located at positions on the phase-field where sinusoidal profile Ø is equal to zero. The position of surfaces 20 correspond to the zero values of sinusoidal relationship Ø such that surfaces 20 are level set to the zero values of sinusoidal relationship Ø. In other words, when sinusoidal relationship Ø equals zero, the position of that zero value determines the position of surfaces 20 of cylinders 12 in the radial direction.

Wall thickness t of cylinders 12 influences the heat transfer capabilities of core 10. In the example of FIG. 2 thickness modifier C' is a negative number. When thickness modifier C' is negative, the sinusoidal profile Ø is shifted downward relative zero-line ZL (shown in FIG. 1D), which causes the amount of negative values NV of sinusoidal profile Ø to increase, while simultaneously decreasing the amount of positive values PV of sinusoidal profile Ø. The downward shift in sinusoidal profile Ø relative zero-line ZL also radially shifts the positions of the zero values of sinusoidal profile Ø relative center axis CA such that passages 14 shrink radially in size and wall thickness t of cylinders 12 increases. The increased wall thickness t increases the mass of core 10, the volume of passages 14, and the radial distance between passages 14, which decreases the rate of heat transfer between passages 14 during operation of core 10. Therefore, increasing wall thickness t of cylinders 12 decreases the heat transfer capabilities of core 10. In an alternative example, thickness modifier C' can be a positive number. When thickness modifier C' is positive, the sinusoidal profile Ø is shifted upward relative zero line ZL (shown in FIG. 1D), which causes the amount of negative values NV of sinusoidal profile Ø to decrease, while simultaneously increasing the amount of positive values PV of sinusoidal profile Ø. The upward shift in sinusoidal profile Ø relative zero line ZL also radially shifts the positions of the zero values of sinusoidal profile Ø relative center axis CA such that passages 14 increase radially in size and wall thickness t of cylinders 12 decreases. The decrease in wall thickness t reduces the radial distance between passages 14 and increases the volume of passages 14, which increases the rate of heat transfer between passages 14. Therefore, decreasing wall thickness t of cylinders 12 increases the heat transfer capabilities of core 10.

FIG. 3 is a perspective view of core 10 with cylinders 12 phase shifted by half a period relative the example of core 10 in FIG. 1B. The phase shifting of cylinders 12 in the example of FIG. 3 can be represented in sinusoidal relationship Ø in the following manner:

$$\emptyset = \sin\left(\frac{2\pi}{d'}r' + P'\right) + C'(r');$$

where phase modifier P' scales cylinders 12 and passages 14 within core 10. Phase modifier P' shifts the relationship Ø radially from center axis CA. As shown in FIG. 3, core 10 follows relationship Ø, which is shifted half a period (n). Phase modifier P' allows core 10 to be scaled to adjust the number of cylinders 12 and passages 14 to fit within envelope 16.

Figure 4A:
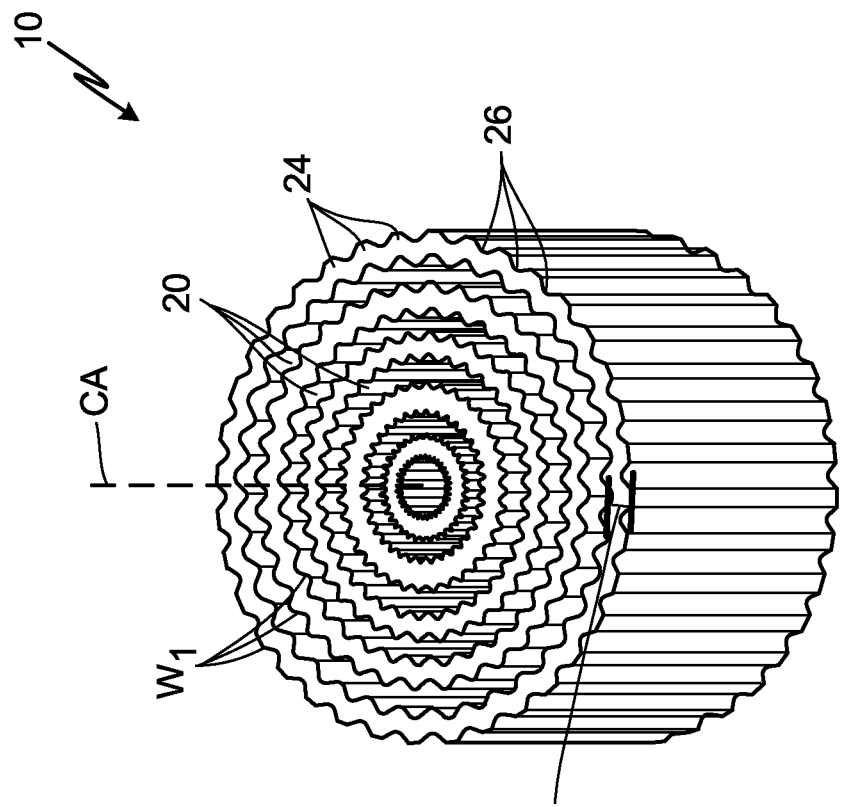
FIG. 4A is a perspective view of another embodiment of a radial heat exchanger core including the plurality of cylinders with waviness.
Figure 4B:
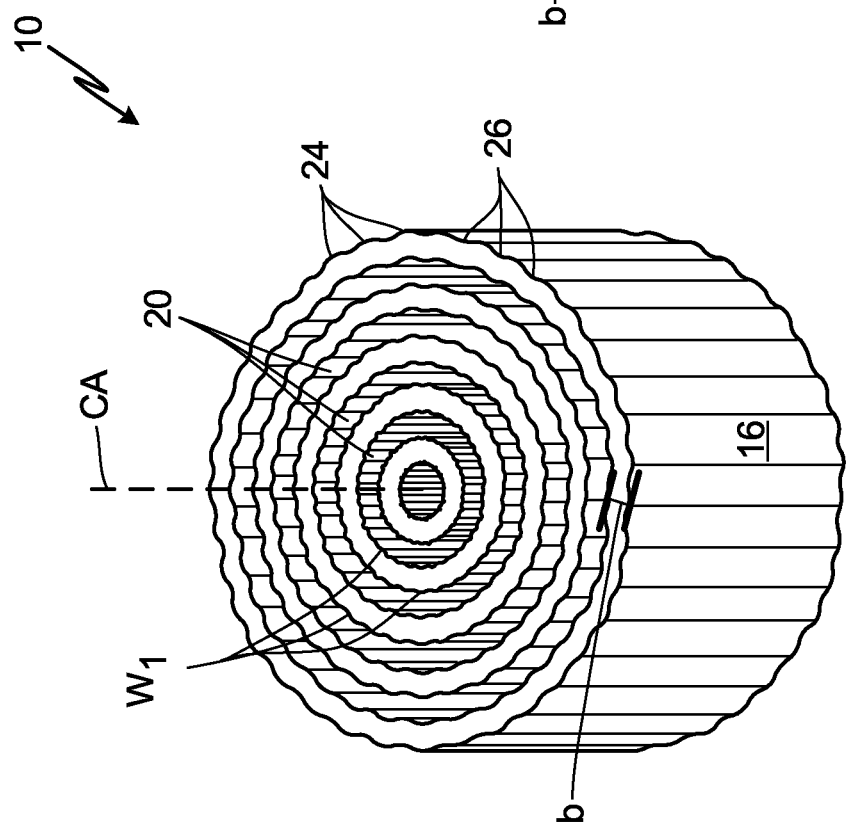
FIG. 4B is a perspective view of another embodiment of a radial heat exchanger core with a plurality of cylinders with waviness.

FIGS. 4A-4B will be discussed concurrently. FIG. 4A is a perspective view of another example of core 10 where cylinders 12 include first waviness $W_1$. FIG. 4B is a perspective view of another example of core 10 with cylinders 12 having first waviness $W_1$ with a greater amplitude than the example of FIG. 4A. At least one of cylinders 12 includes first waviness $W_1$. In the examples of FIGS. 4A and 4B, all of cylinders 12 include first waviness $W_1$. First waviness $W_1$ includes crests 24, troughs 26, amplitude b, and wavelength λ. Crests 24 and troughs 26 of first waviness $W_1$ extend in the radial direction, and wavelength λ extends circumferentially around center axis CA. First waviness $W_1$ can be defined by altering sinusoidal relationship Ø as follows:

$$\emptyset = \sin\left[2\pi\left(\frac{r'}{d'} + b\sin(n\theta)\right)\right] + C'(r'); \text{ where } \theta = \tan^{-1}\left(\frac{y}{x}\right).$$

Amplitude b determines a radial height of first waviness $W_1$. Constant n defines the number of arc segments about center axis CA of first waviness $W_1$. Each arc segment corresponds to a single length of wavelength λ. Direction y is a conversion from polar coordinates to cartesian coordinates where:

$y=r' \sin(\phi)$, where $\phi$ is the polar angle at which radius r' extends from center axis CA. Direction x is a conversion from polar coordinates to cartesian coordinates where:

$x=r' \cos(\phi)$.

First waviness $W_1$ of core 10 influences the rate of heat transfer within core 10. Amplitude b defines the radial height of crests 24 and the radial depth of troughs 26. The example in FIG. 4B has a larger amplitude b than the example of FIG. 4A, such that the radial distance between crests 24 and troughs 26 in core 10 of FIG. 4B is larger than in core 10 of FIG. 4A. The increase in radial distance between crests 24 and troughs 26 in the example of FIG. 4B increases the surface area of cylinders 12 of FIG. 4B in comparison to the example of FIG. 4A. The increase in surface area of cylinders 12 in the example of FIG. 4B increases the heat transfer capabilities of core 10 in comparison to the example of FIG. 4A. Due to first waviness $W_1$, each of the examples shown in FIGS. 4A and 4B have increased heat transfer capabilities in comparison to examples of core 10 that do not include first waviness $W_1$. In addition to increasing surface area, first waviness $W_1$ can be adjusted and tailored to promote turbulent flow within passages 14 of the examples of core 10 shown in FIGS. 4A-4B. Increasing amplitude b of first waviness $W_1$ further interrupts the flow of a fluid through passages 14. The interruption of the flow of a fluid through passages 14 can promote turbulent flow within passages 14, further improving the heat transfer capabilities of core 10.

Figure 5:
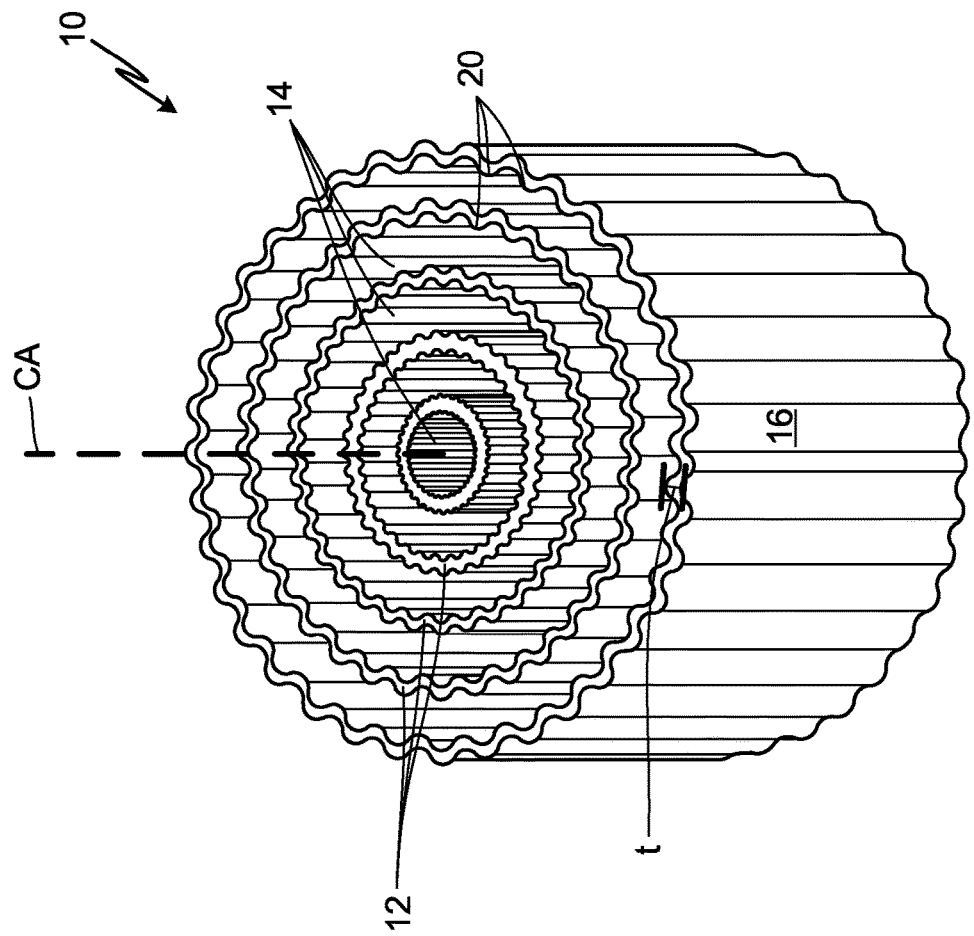
FIG. 5 is a perspective view of another embodiment of a radial heat exchanger core with a plurality of cylinders having waviness.

FIG. 5 is a perspective view of another example of core 10 with cylinders 12 having first waviness $W_1$ and a decreased wall thickness t. The example of core 10 shown in FIG. 5 combines the benefit of first waviness $W_1$ as shown in FIGS. 4A-4B and thickness modifier C' as shown in FIGS. 2A-2B. The example of core 10 shown in FIG. 5 decreases wall thickness t by decreasing thickness modifier C'. Decreasing wall thickness t decreases the radial distance between passages 14. Decreasing the radial distance between passages 14 improves the heat transfer between passages 14. Therefore, the decreased wall thickness t of cylinders 12 improves the heat transfer capabilities of core 10.

Figure 6A:
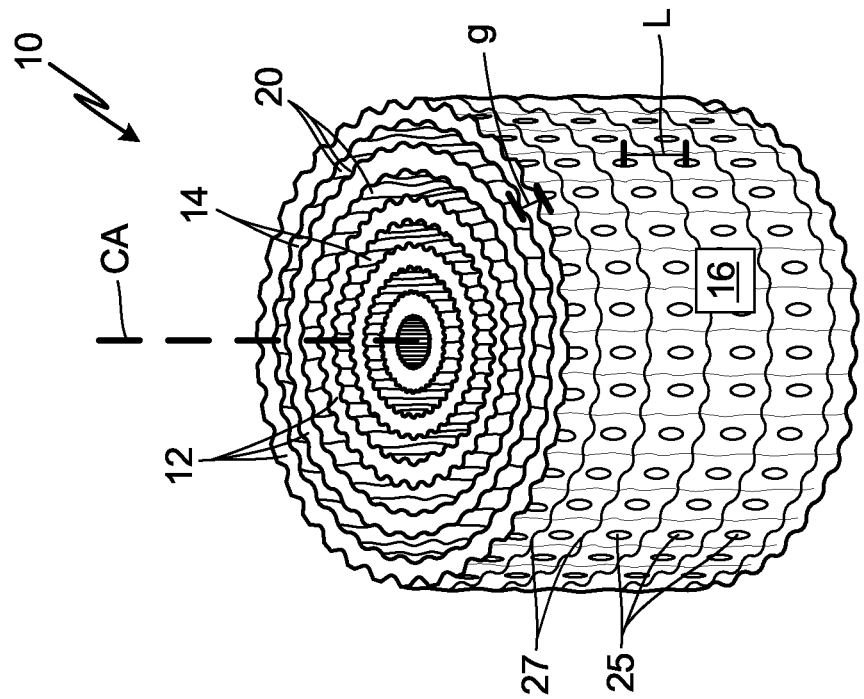
FIG. 6A is a perspective view of another embodiment of a radial heat exchanger core with a plurality of cylinders having a first waviness and a second waviness.
Figure 6B:
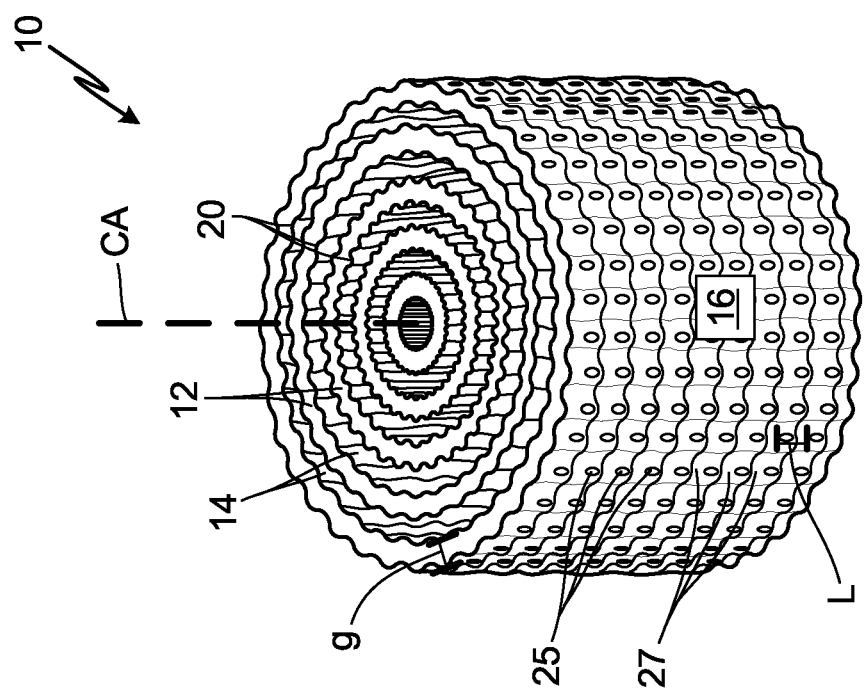
FIG. 6B is a perspective view of another embodiment of a radial heat exchanger core with a plurality of cylinders having a first waviness and a second waviness.

FIGS. 6A-6B will be discussed concurrently. FIG. 6A is a perspective view of another example of core 10 with cylinders 12 including first waviness $W_1$ and second waviness $W_2$. FIG. 6B is a perspective view of another example of core 10 with cylinders 12 including both first waviness $W_1$ and second waviness $W_2$. Second waviness $W_2$ includes crests 25, troughs 27, second amplitude g, and wavelength $\lambda_2$. Crests 25 and troughs 27 extend radially in height and depth relative center axis CA. Wavelength $\lambda_2$ of second waviness $W_2$ extends axially relative to center axis CA. Second waviness $W_2$ can be defined by altering sinusoidal relationship Ø as follows:

$$\emptyset = \sin\left[2\pi\left(\frac{r'}{d'} + b\sin(n\theta) + g\sin\left(2\pi\frac{z}{L}\right)\right)\right] + C'(r'); \text{ where } \theta = \tan^{-1}\left(\frac{y}{x}\right).$$

Second amplitude g is an amplitude in the radial direction of second waviness $W_2$ relative to center axis CA. Position z is a position in the axial direction, and L is wavelength $\lambda_2$ in the axial direction for second waviness $W_2$.

Second waviness $W_2$ improves the heat transfer performance of core 10 by increasing the surface area of cylinders 12 within core 10. Wavelength $\lambda_2$ sets the distance in the axial direction between crests 25 and between troughs 27. The example of core 10 in FIG. 6B has a larger wavelength $\lambda_2$ than core 12 in the example of FIG. 6A. Thus, crests 25 and troughs 27 in the example of FIG. 6B are spaced further apart in the axial direction in comparison to the example of FIG. 6A.

Second amplitude g can be adjusted and controlled in the design process of core 10 to attain desired heat transfer capabilities for core 10. Increasing second amplitude g increases the radial height of crests 25 and radial depth of troughs 27. The increased height and depth of crests 25 and troughs 27 increases the surface area between cylinders 12 and passages 14. As previously discussed, increasing surface area between cylinders 12 and passages 14 improves the heat transfer capabilities of core 10. On the other hand, decreasing second amplitude g decreases the radial distance between crests 25 and troughs 27. The decreased radial distance between crests 25 and troughs 27 decreases the surface area between cylinders 12 and passages 14. As previously discussed, decreased surface area between cylinders 12 and passages 14 decreases the heat transfer capabilities of core 10.

Implementing second waviness $W_2$ on cylinders 12 improves heat transfer capabilities of core 10 because second waviness $W_2$ increases the surface area between cylinders 12 and passages 14. For the same reasons, the example of core 10 in FIG. 6A would have a higher heat transfer rate than the example of core 10 in FIG. 4B. In addition to the increased surface area, the examples of core 10 shown in FIGS. 6A-6B can be tailored to promote a turbulent flow within passages 14 of core 10. Second waviness $W_2$ can be altered to produce a geometry inside passages 14 that interferes with the flow of a fluid within passages 14 to create a turbulent flow within passage 14. The turbulent flow within passages 14 would further improve the heat transfer of core 10.

Figure 7B:
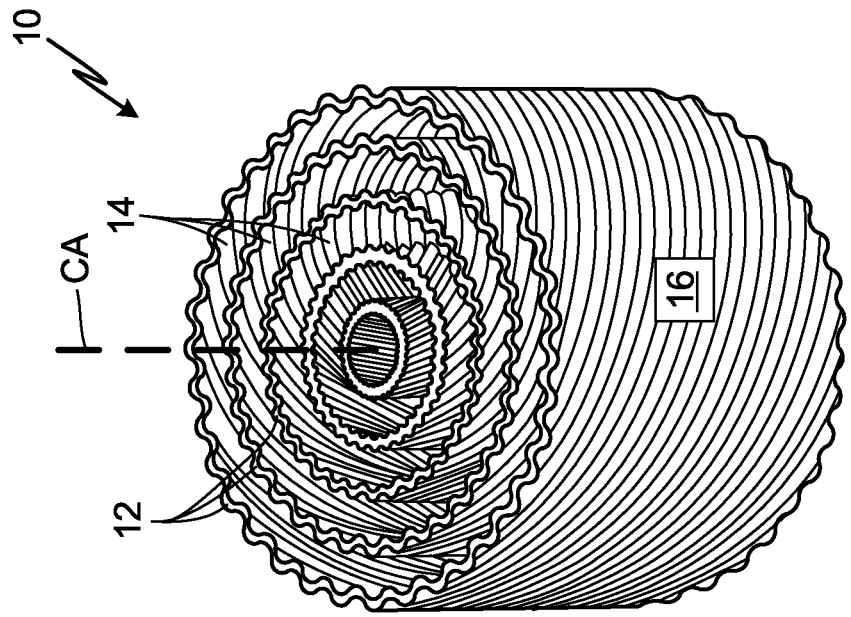
FIG. 7B is a perspective view of another embodiment of a radial heat exchanger core with a plurality of cylinders twisted circumferentially as the plurality of cylinders extend axially.
Figure 7A:
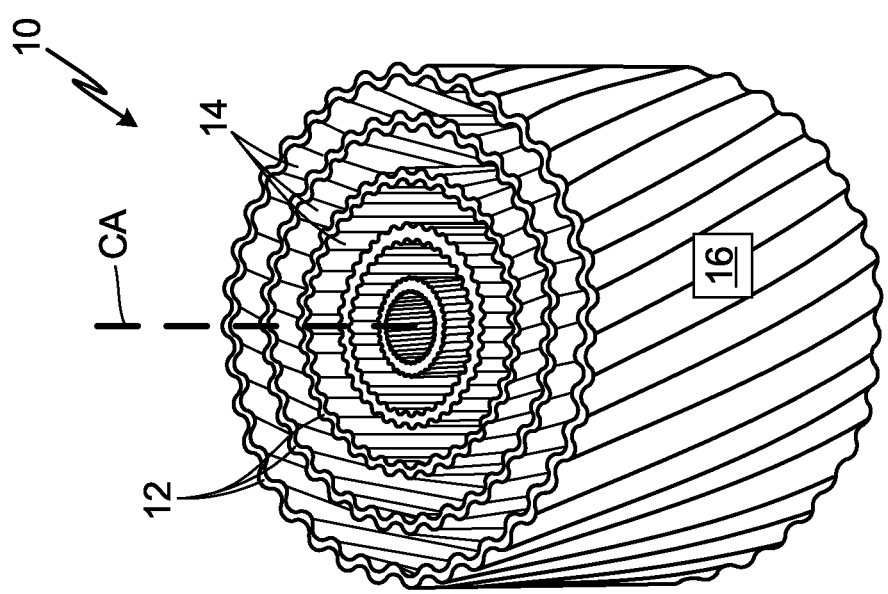
FIG. 7A is a perspective view of another embodiment of a radial heat exchanger core with a plurality of cylinders twisted circumferentially as the plurality of cylinders extend axially.

FIGS. 7A and 7B will be discussed concurrently. Each of FIGS. 7A and 7B shows a perspective view of an example of core 10 with cylinders 12 including first waviness $W_1$ and being twisted circumferentially as cylinders 12 extend axially. A twist can be added to cylinders 12 to alter the heat transfer capabilities of core 10. When cylinders 12 include the twist, the surface area of cylinders 12 increases while staying within envelope 16. The increased surface area of cylinders 12 increases the heat transfer capabilities of core 10. The twist of cylinders 12 can be tailored to change the heat transfer within envelop 16 of core 10. For example, core 10 in FIG. 7A has a twist of 1 degree per axial millimeter. Core 10 in FIG. 7B has a twist of 5 degrees per axial millimeter. As core 10 in FIG. 7B has a larger twist than core 10 in FIG. 7A, cylinders 12 in FIG. 7B have a larger surface area than cylinders 12 in FIG. 7A despite the fact that both cores 10 are the same overall size. Therefore, core 10 in FIG. 7B has a larger heat transfer coefficient than core 10 of FIG. 7A while remaining within the same sized envelope 16 (omitted from FIGS. 7A and 7B) as core 10 of FIG. 7A.

Figure 8B:
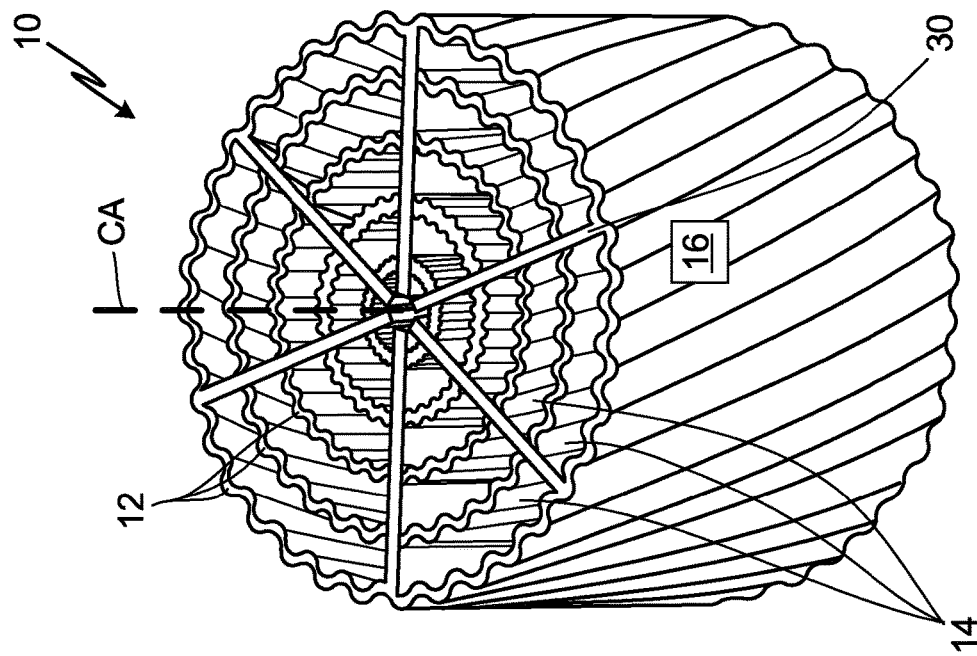
FIG. 8B is a perspective view of another embodiment of a radial heat exchanger core with a plurality of cylinders twisted circumferentially and a plurality of struts.
Figure 8A:
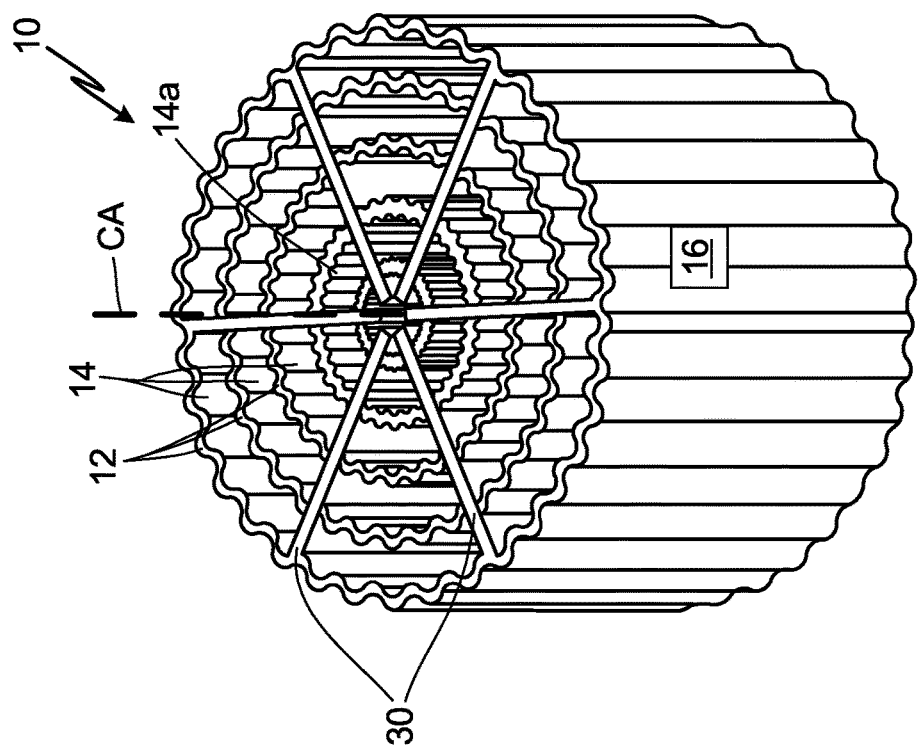
FIG. 8A is a perspective view of another embodiment of a radial heat exchanger core with a plurality of struts.
Figure 8C:
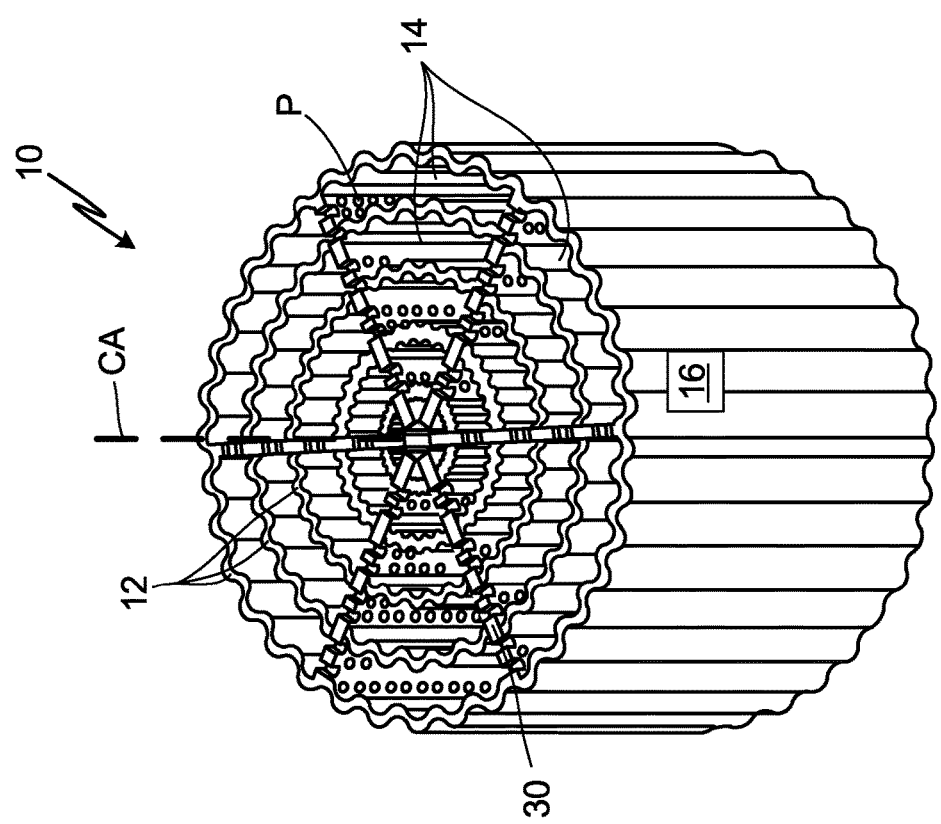
FIG. 8C is a perspective view of another embodiment of a radial heat exchanger core with a plurality of struts having a plurality of perforations.

FIGS. 8A-8C will be discussed concurrently. FIG. 8A is a perspective view of core 10 having a plurality of struts 30. FIG. 8B is a perspective view of core 10 including the plurality of struts 30 and a circumferential twist around center axis CA. FIG. 8C is a perspective view of core 10, including the plurality of struts 30 along with a plurality of perforations P. Core 10 can include plurality of struts ("struts") 30. Struts 30 extend radially through cylinders 12 from center axis CA to envelope 16 and extend axially with relation to center axis CA. Struts 30 are spaced from one another circumferentially.

Struts 30 increase the structural integrity of core 10 by providing support against pressure loads and thermal stresses. Struts 30 also improves the heat transfer properties of core 10 by adding surface area between cylinders 12 and passages 14. Additionally, struts 30 can subdivide passages 14 into a predetermined number of subpassages. As shown in FIG. 8A, struts 30 extend through passages 14, which results in additional subpassages. In this configuration, first passage 14a is divided into six subpassages. Each of those passages can support the flow of either a hot or a cold fluid. The subpassages that struts 30 make within passages 14 enable core 10 to be customized to fit various performance levels without changing the overall size of core 10.

In the example shown in FIG. 8B, core 10 is twisted circumferentially without twisting struts 30. In this example, struts 30 increase the stability of core 10 by provide support against pressure loads and thermal stresses. Struts 30 also guide a fluid axially, generating more resistance to flow through core 10. In another example, struts 30 can be twisted circumferentially relative to cylinders 12 and envelope 16. In that example, struts 30 improve the structural integrity core 10 by providing support against pressure loads and thermal stresses. Struts 30 also guide the flow of a fluid through passages 14 along the profile of first waviness $W_1$. Therefore, in that example, struts 30 improve the stability of core 10 without creating as much resistance to flow through core 10 as the example in FIG. 8B.

In addition to struts, columns or fins can be included within passages 14. The columns or fins will improve the mechanical integrity of core 10 by providing support against thermal stresses and pressure loads. The columns or fins will also enhance the heat transfer capabilities of core 10 because they will increase the surface area within passages 14.

In the example shown in FIG. 8C, struts 30 include perforations P. Perforations P extend circumferentially through struts 30 and are distributed both radially and axially on struts 30. Perforations P allow fluid communication within each of passages 14. Therefore, perforations P can be used to further customize the fluid flow through core 10. Adjusting perforations P changes the surface area of struts 30. The increases or decreases in the surface area of struts 30 increases or decreases the heat transfer capabilities of core 10, respectively. In the example shown in FIG. 8C, perforations P are circular. In another example, perforations P can be circles, squares, triangles, octagons, pentagons, and/or any other shape and/or a mixture of shapes.

Figure 9B:
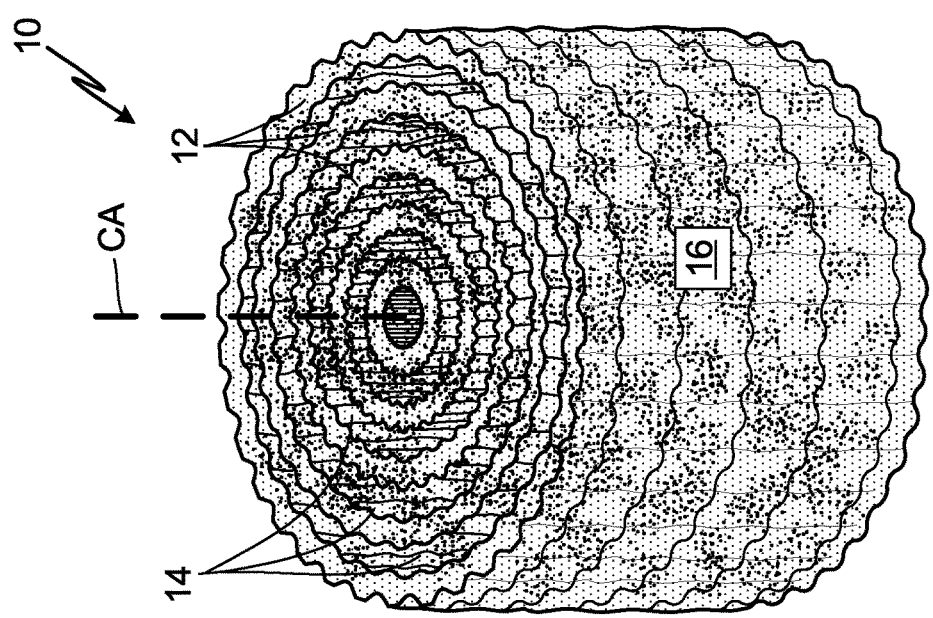
FIG. 9B is a perspective view of another embodiment of a radial heat exchanger core with a textured surface.
Figure 9C:
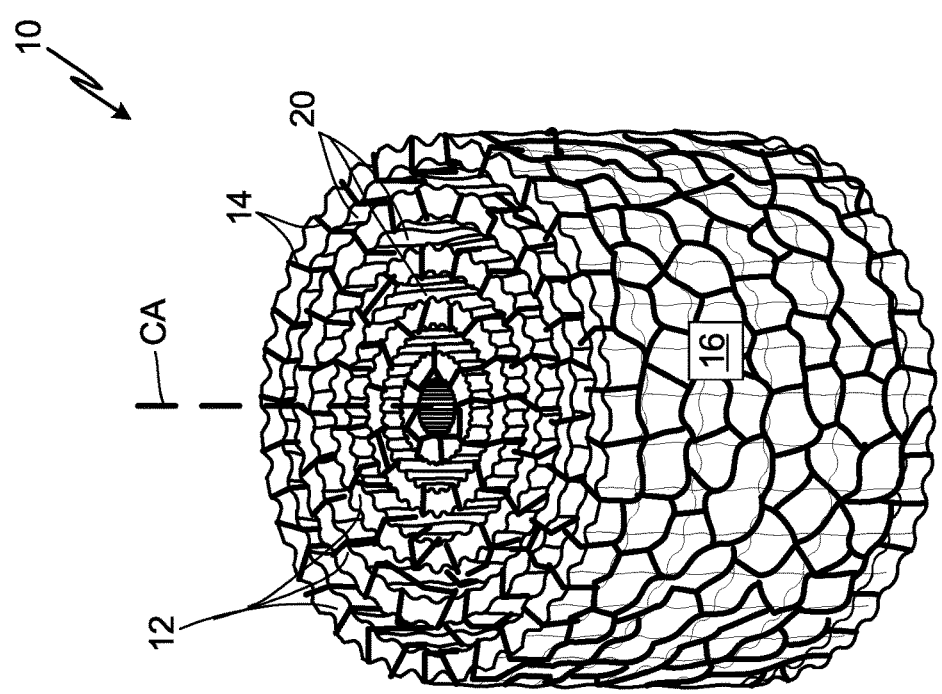
FIG. 9C is a perspective view of another embodiment of a radial heat exchanger core with a geometry on a surface of the radial heat exchanger core.

FIGS. 9A-9C will be discussed concurrently. FIG. 9A is a perspective view of core 10, including cylinders 12, passages 14, and struts 30. FIG. 9B is a perspective view of core 10 including cylinders 12 and passages 14 with a textured surface. FIG. 9C is a perspective view of core 10 including cylinders 12, passages 14, and a geometry on the surface core 10, cylinders 12, and passages 14. As shown in FIGS. 9A-9C, the features discussed with reference to FIGS. 1A-8C can be combined and incorporated into core 10. Combining the various features enables core 10 to be customized and scalable.

In the example of FIG. 9A, struts 30 can have different shapes or contours that help define passages 14. For example, struts 30 can include a wave-like profile that adds a jagged contour to passages 14. The jagged contour interrupts the flow path, increasing the likelihood of turbulent flow within passages 14. Additionally, the jagged contour increases the surface area within passages 14. The turbulent flow and the increased surface area work in concert to improve the heat transfer of core 10.

In the example of core 10 in FIG. 9B, cylinders 12 and envelope 16 can include a textured surface. The textured surface increases the surface area of core 10. Additionally, the textured surface can add resistance to flow through core 10. The increased surface area and the resistance to flow can be altered to change the heat transfer capabilities of core 10. If the textured surface is made rougher, the surface area and resistance to flow will increase. The increased surface area will improve the heat transfer capabilities of core 10. The increased resistance to flow will increase the pressure drop across core 10. If the textured surface is made less rough, the surface area and resistance to flow will decrease. The decreased surface area will decrease the heat exchanger capabilities of core 10. The decreased resistance to flow will decrease the pressure drop across core 10.

In the example of FIG. 9C, core 10 can include a geometric texture on surfaces 20 of cylinders 12. The geometric texture on cylinders 12 increases the surface area within passages 14 and alters a resistance to the flow of a fluid through passages 14. The increased surface area and the changed resistance to flow through passages 14 influence the heat transfer of core 10. For example, if a density of the geometric texture is increased, the surface area and resistance to flow increase. The increased surface area and resistance to flow increases the heat transfer capabilities of core 10. If the density of the geometric textures is decreased, the surface area and resistance to flow will decrease. The decreased surface area and resistance to flow would reduce the heat transfer capabilities of core 10. In the example of FIG. 9C, core 10 has a geometric texture on surfaces 20 of cylinders 12 that is a Voronoi deboss. In other examples, the geometric texture on walls 20 of cylinders 12 can be a simlex noise deboss, Voronoi bubble, or any other surface texture that can be used to influence flow through passages 14 of core 10.

Each of the features discussed with reference to FIGS. 1A-9C can be modified, or adjusted to influence the heat transfer within core 10. Additionally, core 10 can be scaled up or down by using the above formulas. Therefore, with these modifications, core 10 is a scalable, adjustable radial heat exchanger core.

In the examples of FIGS. 1A-9C, core 10 can be made from aluminum. In another example, core 10 can be made from stainless steel, steel, titanium, nickel alloys, or any other material with a high thermal conductivity. Furthermore, in the examples of FIGS. 1A-9C, core 10 can be additively manufactured using a powder bed fusion additive manufacturing machine. In another example, core 10 can be additively manufactured using any other kind of additive manufacturing machine.

Discussion of Possible Embodiments

In one example, a heat exchanger core includes a first hollow cylinder extending circumferentially around a center axis and extending axially along the center axis. The first hollow cylinder includes a first passage disposed radially within the first hollow cylinder and extending axially through the first hollow cylinder. A second hollow cylinder extends circumferentially around the center axis and extends axially along the center axis. The first hollow cylinder is disposed radially within the second hollow cylinder. The second hollow cylinder includes a second passage disposed radially between the first hollow cylinder and the second hollow cylinder and extending axially between the first hollow cylinder and the second hollow cylinder. The first hollow cylinder fluidically separates the first passage from the second passage. The first and second hollow cylinders and the first and second passages are spaced from one another in a sinusoidal relationship.

The heat exchanger core of the preceding paragraph can optionally include, additionally and/or alternatively, any one or more of the following features, configurations and/or additional components:

wherein the first hollow cylinder comprises: a first outer surface; a first inner surface, wherein the first inner surface is radially inward from the first outer surface; and a first thickness between the first outer surface and the first inner surface, wherein the second hollow cylinder comprises: a second outer surface; a second inner surface, wherein the second inner surface is radially inward from the second outer surface; and a second thickness between the second outer surface and the second inner surface, and wherein the first thickness is the same as the second thickness;

wherein the first hollow cylinder comprises a first wall thickness, the second hollow cylinder comprises a second wall thickness, and wherein the first and the second wall thicknesses are equal;

wherein at least one of the first and second hollow cylinders comprises a wall with a first waviness with troughs and crests extending in the radial direction and a wavelength extending circumferentially about the center axis;

wherein the wall comprises a second waviness with troughs and crests extending in the radial direction and a wavelength extending axially relative the center axis;

wherein the wall comprises a second waviness with troughs and crests extending in the radial direction and a wavelength extending axially relative the center axis;

further comprising: a plurality of struts extending radially through the first and second passages and extending axially along the center axis, wherein the plurality of struts are spaced from one another circumferentially around the center axis;

wherein the plurality of struts defines a first plurality of passages within the first passage and a second plurality of passages within the second passage;

wherein at least one of the first and second hollow cylinders comprises: a wall with a first waviness with troughs and crests extending in the radial direction and a wavelength extending circumferentially about the center axis, and wherein the wall comprises a second waviness with troughs and crests extending in the radial direction and a wavelength extending axially relative the center axis;

wherein each of the first and second hollow cylinders comprises: a wall with a first waviness with troughs and crests extending in the radial direction and a wavelength extending circumferentially about the center axis, and wherein the wall comprises a second waviness with troughs and crests extending in the radial direction and a wavelength extending axially relative the center axis;

wherein the first and second hollow cylinders are twisted circumferentially as the first and second hollow cylinders extend in the axial direction; and/or wherein at least one of the first hollow cylinder, the second hollow cylinder, and the plurality of struts comprises a textured surface.

In another example, a heat exchanger core includes a first hollow cylinder extending circumferentially around a center axis and extending axially along the center axis. The first hollow cylinder includes a first passage disposed radially within the first hollow cylinder and extending axially through the first hollow cylinder. A second hollow cylinder extends circumferentially around the center axis and extends axially along the center axis. The first hollow cylinder is disposed radially within the second hollow cylinder. The second hollow cylinder includes a second passage disposed radially between the first hollow cylinder and the second hollow cylinder and extending axially between the first hollow cylinder and the second hollow cylinder. The first cylinder fluidically separates the first passage from the second passage. The first and second hollow cylinders and the first and second passages are spaced from one another by the following relationship:

$$\emptyset = \sin \frac{2\pi}{d'} r';$$

where Ø is the phase field, d' is the wavelength, and r' is a radius of the heat exchanger core relative the central axis.

The heat exchanger core of the preceding paragraph can optionally include, additionally and/or alternatively, any one or more of the following features, configurations and/or additional components:

wherein at least one of the first and second hollow cylinders comprises a wall thickness, wherein the phase field and the wall thickness are defined by:

$$\emptyset = \sin\left(\frac{2\pi}{d'} r'\right) + C';$$

where C' is a constant thickness modifier;

wherein a negative constant thickness modifier C' increases the wall thickness, and wherein a positive constant thickness modifier C' decreases the wall thickness;

wherein the phase field, the wall thickness, and a phase shift are defined by:

$$\emptyset = \sin\left(\frac{2\pi}{d'} r' + P'\right) + C'(r');$$

where P' is a phase modifier;

wherein at least one of the first and second hollow cylinders comprises a first waviness with troughs and crests extending in the radial direction and a wavelength extending circumferentially about the center axis, and wherein the phase field, the wall thickness, the phase shift, and the first waviness are defined by:

$$\emptyset = \sin\left[2\pi\left(\frac{r'}{d'} + b\sin(n\theta)\right)\right] + C'(r'); \text{ where } \theta = \tan^{-1}\left(\frac{y}{x}\right);$$

where b is an amplitude of the waviness, n equals a quantity of arc segments, and θ is an angle between a first value y and a second value x, wherein first value y and second value x are the cartesian coordinate equivalents of r';

wherein at least one of the first and second hollow cylinders comprises a second waviness with troughs and crests extending in the radial direction and a wavelength extending axially relative the center axis, and wherein the phase field, the wall thickness, the phase shift, the first waviness, and the second waviness are defined by:

$$\emptyset = \sin\left[2\pi\left(\frac{r'}{d'} + b\sin(n\theta) + g\sin\left(2\pi\frac{z}{L}\right)\right)\right] + C'(r'); \text{ where } \theta = \tan^{-1}\left(\frac{y}{x}\right);$$

where g is an amplitude of the axial waviness, z is a position in the axial direction, and L is a wavelength for the axial waviness;

wherein at least one of the first and second hollow cylinders is twisted circumferentially as the wall extends in the axial direction; and/or further comprising: a plurality of struts extending radially through the first and second passages and extending axially relative the center axis, wherein the plurality of struts are spaced from one another circumferentially around the center axis, and wherein the first and second hollow cylinders and the plurality of struts have a textured surface.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, in each of the discussed embodiments envelope 16 is the same. In other embodiments, envelope 16 can be adjusted to further tailor the heat exchanger capabilities within the allotted space. Therefore, it is intended that the invention not be limited to the particular embodiment(s) disclosed, but that the invention will include all embodiments falling within the scope of the appended claims.

The invention claimed is:

1. A heat exchanger core comprising:
   a first hollow cylinder extending circumferentially around a center axis and extending axially along the center axis, wherein the first hollow cylinder comprises:
      a first passage disposed radially within the first hollow cylinder and extending axially through the first hollow cylinder; and
   a second hollow cylinder extending circumferentially around the center axis and extending axially along the center axis, wherein the first hollow cylinder is disposed radially within the second hollow cylinder, and wherein the second hollow cylinder comprises:

a second passage disposed radially between the first hollow cylinder and the second hollow cylinder, the second passage extending axially between the first hollow cylinder and the second hollow cylinder, wherein the first hollow cylinder fluidically separates the first passage from the second passage, wherein the first and second hollow cylinders are radially spaced a distance from one another, the distance defined by d' of a sinusoidal function represented by:

$$\emptyset = \sin 2\pi/d'r'$$

where Ø is a phase field, and r' is it radius, wherein:
the phase field is a value, and wherein if the value is negative a region described by the phase field is a portion of the first hollow cylinder or the second hollow cylinder and wherein if the value is positive, the region described by the phase field is a portion of the first passage or the second passage; and the radius is a radius of the heat exchanger core relative the center axis; and wherein at least one of the first and second hollow cylinders comprises a first sinusoidal waviness with troughs and crests extending in the radial direction.

2. The heat exchanger core of claim 1, wherein the first hollow cylinder comprises:
a first outer surface;
a first inner surface, wherein the first inner surface is radially inward from the first outer surface; and
a first thickness between the first outer surface and the first inner surface,
wherein the second hollow cylinder comprises:
a second outer surface;
a second inner surface, wherein the second inner surface is radially inward from the second outer surface; and
a second thickness between the second outer surface and the second inner surface, and
wherein the first thickness is the same as the second thickness.

3. The heat exchanger core of claim 1, wherein the first hollow cylinder comprises a first wall thickness, the second hollow cylinder comprises a second wall thickness, and wherein the first and the second wall thicknesses are equal.

4. The heat exchanger core of claim 1, wherein the at least one of the first and second hollow cylinders comprises second sinusoidal waviness with troughs and crests extending in the radial direction and a wavelength extending circumferentially about the center axis.

5. The heat exchanger core of claim 1, further comprising:
a plurality of struts extending radially through the first and second passages and extending axially along the center axis, wherein the plurality of struts are spaced from one another circumferentially around the center axis.

6. The heat exchanger core of claim 5, wherein the plurality of struts defines a first plurality of passages within the first passage and a second plurality of passages within the second passage.

7. The heat exchanger core of claim 6, wherein at least one of the first and second hollow cylinders comprises:
a second sinusoidal waviness with troughs and crests extending in the radial direction and a wavelength extending circumferentially about the center axis.

8. The heat exchanger core of claim 7, wherein the first and second hollow cylinders are twisted circumferentially as the first and second hollow cylinders extend in the axial direction.

9. The heat exchanger core of claim 8, wherein at least one of the first hollow cylinder, the second hollow cylinder, and the plurality of struts comprises a textured surface.

10. A heat exchanger core comprising:
a first hollow cylinder extending circumferentially around a center axis and extending axially along the center axis, wherein the first hollow cylinder comprises:
a first passage radially within the first hollow cylinder and extending axially through the first hollow cylinder;
a second hollow cylinder extending circumferentially around the center axis and extends axially along the center axis, wherein the first hollow cylinder is radially within the second hollow cylinder, and wherein the second hollow cylinder comprises:
a second passage, radially between the first hollow cylinder and the second hollow cylinder, the second passage extends axially between the first hollow cylinder and the second hollow cylinder, wherein the first cylinder fluidically separates the first passage from the second passage;
wherein a radially inner wall of the first hollow cylinder and a radially inner wall of the second hollow cylinders are spaced a distance from one another, the distance defined by d' of the following relationship:

$$\emptyset = \sin \frac{2\pi}{d'} r';$$

where Ø is a phase field, and r' is a radius, wherein:
the phase field is a value, and wherein if the value is negative a region described by the phase field is a portion of the first hollow cylinder or the second hollow cylinder and wherein if the value is positive, the region described by the phase field is a portion of the first passage or the second passage; and
the radius is radius of the heat exchanger core relative the center axis.

11. The heat exchanger core of claim 10, wherein the phase field is further defined by:

$$\emptyset = \sin\left(\frac{2\pi}{d'} r'\right) + C';$$

where C' is a constant thickness modifier, wherein the constant thickness modifier alters a thickness of the first hollow cylinder and the second hollow cylinder, and wherein a negative constant thickness modifier C' increases the thickness, and wherein a positive constant thickness modifier C' decreases the thickness.

12. The heat exchanger core of claim 10, wherein the phase field is further defined by:

$$\emptyset = \sin\left(\frac{2\pi}{d'} r' + P'\right) + C'(r');$$

where P' is a phase modifier and C' is a constant thickness modifier, wherein:
the phase modifier alters a width of the first passage by shifting the first hollow cylinder radially towards or radially away from the central axis; and the constant thickness modifier alters a thickness of the first hollow cylinder and the second hollow cylinder, and wherein a negative constant thickness modifier C' increases the thickness, and wherein a positive constant thickness modifier C' decreases the thickness.

13. The heat exchanger core of claim 10, wherein the phase field is further defined by:

$$\emptyset = \sin\left[2\pi\left(\frac{r'}{d'} + b\sin(n\theta)\right)\right] + C'(r'); \text{ where } \theta = \tan^{-1}\left(\frac{y}{x}\right);$$

where b is an amplitude of a waviness, n equals a quantity of arc segments, θ is an angle between a first value y and a second value x, and C' is a constant thickness modifier, wherein:
the amplitude of the waviness is a radial height a trough extends outwards and a crest extends inwards;
the quantity of arc segments determines a number of times that the waviness reaches the radial height;
first value y and second value x are the cartesian coordinate equivalents of r'; and
the constant thickness modifier alters a thickness of the first hollow cylinder and the second hollow cylinder, and wherein a negative constant thickness modifier C' increases the thickness, and wherein a positive constant thickness modifier C' decreases the thickness.

14. The heat exchanger of claim 10, wherein the phase field is further defined by:

$$\emptyset = \sin\left[2\pi\left(\frac{r'}{d'} + b\sin(n\theta) + g\sin\left(2\pi\frac{z}{L}\right)\right)\right] + C'(r'); \text{ where } \theta = \tan^{-1}\left(\frac{y}{x}\right);$$

where b is an amplitude of a radial waviness, n equals a quantity of arc segments, θ is an angle between a first value y and a second value x, g is an amplitude of an axial waviness, z is a position in the axial direction, L is a wavelength for the axial waviness, and C' is a constant thickness modifier, wherein:
the amplitude of the radial waviness is a radial height a trough extends radially outwards and a crest extends radially inwards;
the quantity of arc segments determines a number of times that the waviness reaches the radial height;
first value y and second value x are the cartesian coordinate equivalents of the amplitude of the axial waviness alters the radial height of crests and troughs;
the wavelength for the axial waviness is the distance in the axial direction between crests and troughs of the axial waviness; and
the constant thickness modifier alters a thickness of the first hollow cylinder and the second hollow cylinder, and wherein a negative constant thickness modifier C' increases the thickness, and wherein a positive constant thickness modifier C' decreases the thickness.

15. The heat exchanger of claim 14, wherein at least one of the first and second hollow cylinders is twisted circumferentially as the wall extends in the axial direction.

16. The heat exchanger of claim 15 further comprising:
a plurality of struts extending radially through the first and second passages and extending axially relative the center axis, wherein the plurality of struts are spaced from one another circumferentially around the center axis, and wherein the first and second hollow cylinders and the plurality of struts have a textured surface.

17. A heat exchanger core comprising:
a plurality of cylinders, each cylinder of the plurality of cylinders extending circumferentially around a central axis and extending axially along the central axis, wherein each cylinder of the plurality of cylinders comprises:
a radially outer surface;
a radially inner surface, the radially inner surface is radially inward from the radially outer surface;
a thickness between the radially outer surface and the radially inner surface;
wherein each cylinder of the plurality of cylinders is radially outside a previous cylinder of the plurality of cylinders, wherein a distance between each cylinder of the plurality of cylinders forms a plurality of passageways;
wherein the thickness of each cylinder of the plurality of cylinders and the distance between each cylinder of the plurality of cylinders is defined by d' of the following sinusoidal relationship:

Ø=sin 2π/d'r' where Ø is a phase field, and r' is a radius, wherein:
the phase field is a value, and wherein if the value is negative a region described by the phase field is a cylinder of the plurality of cylinders and wherein if the value is positive, the region described by the phase field is a passageway of the plurality of passageways;
the radius is a radius of the heat exchanger core relative the center axis.

18. The claim of 17, wherein the sinusoidal relationship can be further defined by:

Ø=sin [2π(r'/d'+b sin(nθ)+g sin(2πz/L)]+C'(r'); where θ=tan$^{-1}$(y/x);

where b is an amplitude of a radial waviness, n equals a quantity of arc segments, is an angle between a first value y and a second value x, g is an amplitude of an axial waviness, z is a position in the axial direction, L is a wavelength for the axial waviness, and C' is a constant thickness modifier, wherein:
the amplitude of the radial waviness is a radial height a trough extends radially outwards and a crest extends radially inwards;
the quantity of arc segments determines a number of times that the waviness reaches the radial height;
first value y and second value x are the cartesian coordinate equivalents of r';
the amplitude of the axial waviness alters the radial height of crests and troughs;
the wavelength for the axial waviness is the distance in the axial direction between crests and troughs of the axial waviness; and
the constant thickness modifier alters a thickness of the first hollow cylinder and the second hollow cylinder, and wherein a negative constant thickness modifier C' increases the thickness, and wherein a positive constant thickness modifier C' decreases the thickness.

\* \* \* \* \*